United States Patent [19]

Redmer

[11] 4,039,134

[45] Aug. 2, 1977

[54] MESSAGE HOLDER

[76] Inventor: Wilbert W. Redmer, 71 NE. 11th Way, Deerfield Beach, Fla. 33441

[21] Appl. No.: 681,815

[22] Filed: Apr. 30, 1976

[51] Int. Cl.² .............................................. F16M 13/00

[52] U.S. Cl. .............................. 248/205 A; 248/316 F

[58] Field of Search .................... 248/316 F, 467, 489; 24/244; 211/45

[56] References Cited

U.S. PATENT DOCUMENTS

| | | | |
|---|---|---|---|
| 446,486 | 2/1891 | Van Benthuysen | 248/316 F |
| 2,348,611 | 5/1944 | Davidson | 24/244 |
| 2,377,488 | 6/1945 | Fugazzi | 248/316 F UX |
| 3,350,045 | 10/1967 | Mayers | 248/467 |
| 3,399,429 | 9/1968 | Goodman | 248/489 |

FOREIGN PATENT DOCUMENTS

| | | | |
|---|---|---|---|
| 849,668 | 9/1960 | United Kingdom | 24/244 |

*Primary Examiner*—William H. Schultz
*Attorney, Agent, or Firm*—Laff, Whitesel & Rockman

[57] ABSTRACT

A message holder comprises a plastic housing having a sloping roof with a spring loaded ball detent thereunder. Paper is linearly inserted along a line representing and counter to the force of the spring bias. The ball detent moves back against the spring bias to a point where it may raise under the sloping roof and the paper passes under it. The ball is pulled forward and wedged under the sloping roof when the paper is pulled in the direction of the spring bias. The wedged ball strongly tends to prevent the paper's removal. However, the paper may be removed by sliding it sideways, or perpendicular to the line representing the force of the spring bias.

10 Claims, 7 Drawing Figures

MESSAGE HOLDER

This invention relates to holders for paper, cardboard, cloth, posters or the like (hereinafter generically called "paper") and more particularly to holders for notes and messages.

The following patents relate to holders and similar devices: U.S. Pat. Nos. 110,725 to Barstow; 1,221,279 to Brisley; 1,364,190 to Erickson; 1,646,068 to Rosner; 2,231,883 to Caccivio; 2,710,511 to Baldwin; 3,591,013 to Herrmann;

There are many places and reasons for providing means for holding notes and papers without disfiguring the supporting structure. For example, a person may wish to have a device permanently attached to his door so that he can easily leave a note when he is gone and just as easily remove the note when he returns, with the knowledge that his note will remain in place while he is gone. For example, the wind will not blow it away; nor will it easily tear off a pin or nail if someone snatches it. Also, the person wants a safe device — not a projecting pin which might easily hurt someone, tear clothing, or otherwise cause a problem of potential damage to people or their property.

Accordingly, an object of the invention is to provide a new and improved paper, note or message holder. Here, an object is to provide means for releasably securing papers, notes, messages to doors or the like.

Still another object is to provide means for easily securing a paper to a supporting structure, and for just as easily removing it, while insuring against its inadvertent dislodgment.

Another object is to accomplish the foregoing objects without defacing the supporting structure.

In keeping with an aspect of the invention, these and other objects are accomplished by providing a plastic member comprising a base plate having an upstanding housing mounted thereon. Inside the housing is a spring loaded ball bearing detent which is oriented to move linearly back against the spring bias as paper is inserted under the ball. The roof of the housing slopes from a low point where the paper is inserted to a high point where the paper is in a secured position. As the paper is inserted, the ball detent moves toward the high point where it can easily raise far enough to enable the paper to be positioned under it. If an attempt is made merely to snatch the paper from the holder, the ball detent is pulled in the direction of the spring bias, and wedged under the eaves of the sloping roof, tending to capture the ball. Therefore, to remove the paper, it is necessary to slide it sideways and thereby avoid wedging the ball detent.

The nature of a preferred embodiment may become more apparent from a study of the attached drawing wherein.

Figure 1:
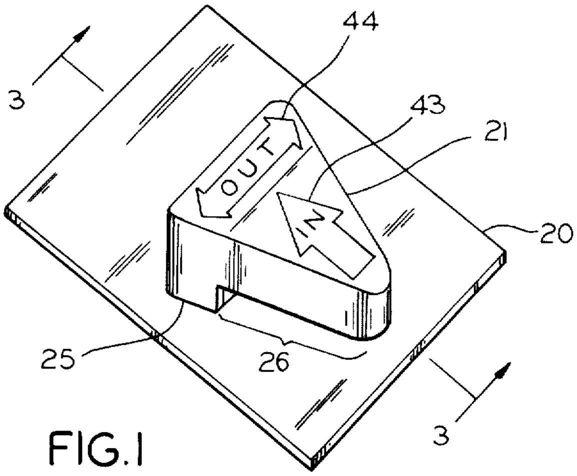
FIG. 1 is a perspective view showing the top of the inventive paper holder.
Figure 2:
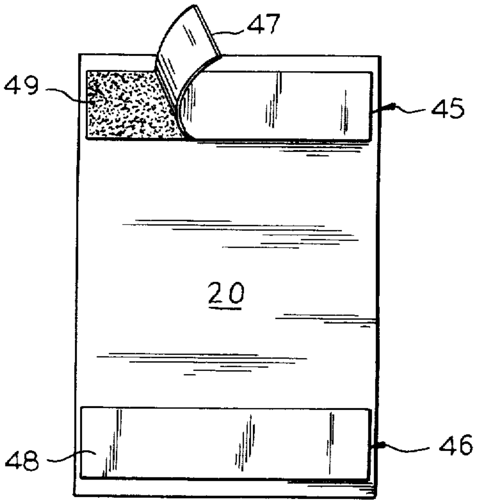
FIG. 2 is a plan view of the back of the message holder showing the mounting method and device.
Figure 3:
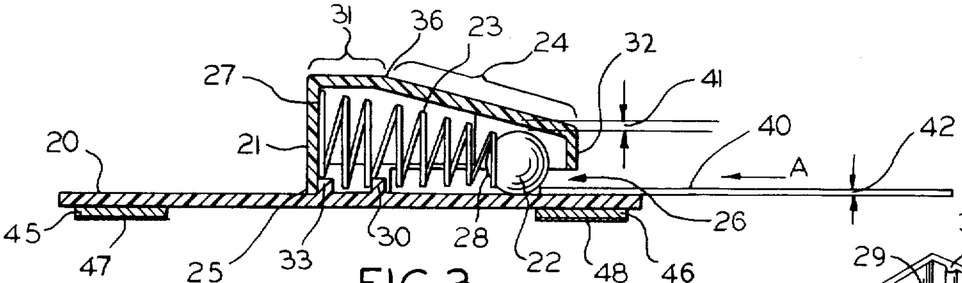
FIG. 3 is a cross sectional view of te holder, taken along line 3—3 of FIG. 1, showing how the detent reacts when paper is inserted into the holder.

The inventive holder comprises two plastic parts 20, 21, a ball detent 22, and a spring 23. The plastic part 20 is a backing plate for mounting the holder. Preferably, plate 20 is rectangular to provide space for imprinting the owner's name, an advertisement, or any other suitable design. The plastic part 21 is a housing having a sloping roof 24 with a cavity therein. The internal housing cavity has tapering contours in both horizontal and vertical directions. The back of the housing 21 is attached at 25 to the backing or mounting plate 20. Between the bottom front of the housing and the mounting plate there is a recess or opening 26, into which an edge of a paper may be inserted. Preferably, the two parts 20, 21 are initially separate pieces which are cemented or otherwise bonded together to form an integral unit. However, the parts may be made in any suitable manner.

Figure 5:
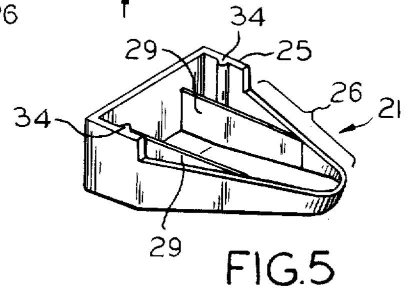
FIG. 5 is a perspective view of the underside of the housing for the inventive paper holder.
Figure 4:
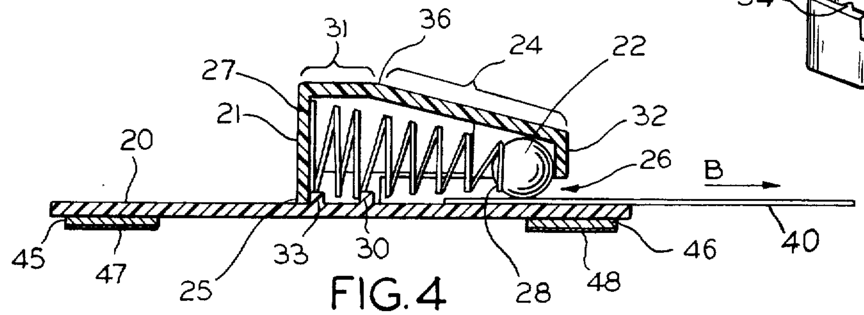
FIG. 4 is a similar cross sectional view showing how the detent wedges when a attempt is made to remove the paper.

The spring 23 is preferably a conical coiled spring having a large end 27 diameter approximately equal to the internal height of the space under the highest part of the housing 21. The small end diameter of the conical spring is slightly less than the diameter of the ball detent 22. Therefore, the ball may rest on and rotate in a seat formed by the final spring convolutions 28 at the small end of the conical spring. Inside the housing 21, a detent ball retainer is formed by a spaced parallel pair of guides 29 (FIG. 5) which are molded to form the edges of space which may be occupied by spring 23 and ball 22. These guides tend to laterally confine the travel of the ball 22 so that it cannot pop out of its seat in convolution 28 of spring 23.

A paper stop embossment 30 is formed on the base plate 20 to limit paper travel. This embossment also tends to capture and hold the bottom of a convolution near the large end 27 of the conical spring 23. The upper side of the large end is held in place under a flat portion 31 and behind the sloping root portion 24 on the top of the housing 21. In this position, the spring 23 urges the ball detent 22 toward the eaves 32 of the housing roof. By inspection, it should be apparent that the internal cavity of the housing tapers and generally follows the contours of the conical spring 23. The paper stop embossment 30 and a pair of other laterally displaced embossments 33 are also formed on the base plate 20 in order to locate and index the position of housing 21 on plate 20. The laterally displaced embossments 33 fit behind vertical guide members 34 (FIG. 5) which are molded inside housing 21.

Figure 6:
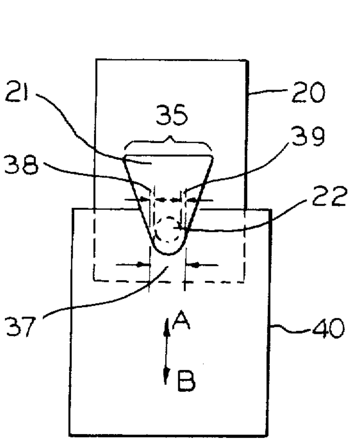
FIG. 6 is a plan view showing how paper may be inserted into the holder.

In plan view (FIGS. 6, 7), the housing is relatively wide at 35 under high part 31 of the housing. From the edge 36 of the high part, and in the sloping roof 24 region, the housing walls taper in width to a narrow part 37, the cavity of which is approximately as wide as the diameter of the ball detent 22.

The physical dimensions and spring tension are such that the ball 22 normally rests where it lightly touches the cavity wall under the sloping surface 24. At this point, there are horizontally opposed clearance spaces 38, 39 on opposite sides of the ball detent 22. Therefore, it is free to move to either the left or the right, as viewed in FIG. 6.

The operation of the ball detent is seen in FIGS. 3-7. When paper 40 is inserted (FIGS. 3 and 6) into space 26 under the front of housing 21, the ball detent moves linearly in direction A, which is counter to the bias of the spring 23. The ball moves toward the high part 31 of the housing. In so moving, the ball 22 is pushed back under the sloping roof 24 for a distance required to provide a vertical clearance 41 at least equal to the thickness 42 of the paper 40. At this point, the ball 22 raises easily, and the paper 40 slips under it as far as the paper stop 30. Thus, the paper 40 may be slipped quickly and easily into place in the recess 26.

If an effort is made to pull or snatch the paper from the housing (FIG. 6), both the paper 40 and the ball detent 22 move, in direction B, (i.e., in line with the spring bias) toward the eaves 32 of the housing 21. As the ball so moves, it becomes wedged under sloping roof 24 and into the horizontal space 37 (FIG. 6), where there is substantially no lateral play or clearance 38, 39. As a result, the ball detent becomes wedged securely into a fixed position, thereby forcing it toward the backing or mounting plate 20 and gripping the paper 40. For many grades of paper, the grip is stronger than the paper itself so that it will tear before it will pull out from under the ball detent. Hence, it is difficult to inadvertently remove the paper, even by snatching or pulling on it.

Figure 7:
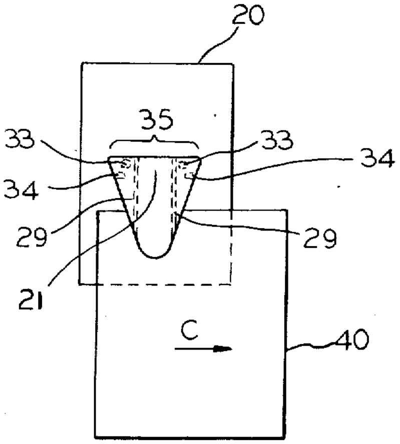
FIG. 7 is a plan view showing how paper may be removed from the holder.

However, it is quite easy to remove the paper by following the proper procedures (FIG. 7). Here, the paper 40 is pulled sideways in direction C. When the paper is in its normal position in the recess 26, there is the relatively large clearance spaces 38, 39 at either side of the ball 22. Hence, when the paper 40 is pulled in direction C, the ball detent 22 may swing slightly into the clearance space, raising far enough to release the paper.

Accordingly, it is easy to slide the paper in direction A in order to secure a note or in direction C in order to remove the note. However, it is difficult to pull the paper in direction B in order to inadvertently dislodge the note. To assist the user, the top of housing 21 may be imprinted with any suitable instructions 44, 43, for indicating the directions of paper insertion and removal.

For ease of mounting, the back of the mounting plate includes one or more strips or pads of compressible material 45, 46, such as dense foam. The opposite sides of strips 45, 46 are coated with a suitable pressure sensitive adhesive. Therefore, the strips may be pressed onto the mounting plates. The adhesive 49 on the exposed sides of the strips 45, 46 are covered by a suitable release papers 47, 48. The adhesive and release paper are of any suitable and well known composition or design. Preferably the paper is silicone-coated.

To attach the inventive holder, it is only necessary to peel off the paper 47, 48, thereby exposing the pressure sensitive adhesive, as at 49. Then the adhesive is pressed against a surface, such as a door. The dense foam follows and conforms to the contours of the surface, fitting over and into the small hills and valleys of surface irregularities. This way, the pressure sensitive adhesive makes good contact and establishes a good seal between the foam and the adjoining surface of a door, or the like.

Those who are skilled in the art will readily perceive how various modifications may be made without departing from the true spirit and scope of the invention. Accordingly, the claims are to be construed to cover all equivalent structures.

What is claimed is:

1. A message holder comprising a mounting plate, a housing having at least one edge, a cavity in the housing, said cavity facing said mounting plate which thereby terminates said cavity, at least one said edge of said housing being mounted on said plate, a paper receiving recess between said plate and said housing at a point other than said one edge, said cavity having tapered internal contours, with a large end of said taper near said one edge of said housing and a small end near said paper receiving recess, a coiled conical spring biased ball detent mounted in said cavity, said conical coiled spring having contours which somewhat generally follow the tapered contours of the cavity, and permit limited lateral play and movement of the ball detent, said spring bias urging said ball toward the small end of said taper, the tension of said spring, the size and shape of said internal contours, and the diameter of said ball being such that said ball moves back and lifts when a paper is inserted into said cavity and moves forward and jams into the small end of said tapered cavity to seize said paper if an attempt is made to pull said paper directly from the recess and moves laterally within said cavity to free said paper responsive to sideward movement of the paper.

2. The message holder of claim 1 and a detent retainer inside said housing for limiting the movements of said coiled spring and ball detent in directions transverse to the direction of normal spring bias.

3. The message holder of claim 2 wherein the terminal convolutions at the small end of the conical spring form a seat on which said ball detent may rest and rotate.

4. The message holder of claim 3 wherein said tapered internal cavity has a large end which forms a seat for said conical spring and a small end approximately the shape of and slightly smaller than the ball detent, whereby said ball normally rests lightly touching a cavity wall surface between said large cavity end and said small cavity end.

5. The message holder of claim 4 wherein the width of the cavity at the point where said ball seizes the paper is greater than the diameter of said ball, so that said lateral play is between the ball and the cavity wall, whereby paper may be slid sideways in said recess.

6. The message holder of claim 1 wherein the terminal convolution at one end of the conical spring forms a seat on which said ball detent may rest and rotate.

7. The message holder of claim 6 and a paper stop embossment molded on said mounting plate at the end of said cavity which is remote from said recess.

8. The message holder of claim 7 and at least one piece of sponge-like material on the back of said mounting plate, a pressure sensitive adhesive on at least the exposed surface of said sponge-like material, and a release paper covering said pressure sensitive adhesive.

9. A message holder comprising a mounting plate, a housing having at least one edge, a cavity in the housing, at least said one edge of said housing being mounted on said plate, a paper receiving recess between said plate and said housing at a point other than said one edge, said cavity having tapered internal contours, with a large end of said taper near said one edge of said housing and a small end near said paper receiving recess, a coiled spring biased ball detent mounted in a retainer within said cavity, said coiled spring being somewhat conical, having contours which generally follow the tapered contours of the cavity, the terminal convolutions at the small end of the conical spring forming a seat on which said ball detent may rest and rotate, said tapered internal cavity having a large end which forms a seat for said conical spring and a small end approximately the shape of and slightly smaller than the ball detent, whereby said ball normally rests lightly touching a cavity wall surface between said large cavity end and said small cavity end, said spring bias urging said ball toward the small end of said taper, said detent retainer comprising a pair of spaced parallel walls inside the housing, said walls being spaced from each other a distance approximately equal to the diameter of the large end of said conical spring, the bias of said spring, the size and shape of said internal contours, and the diameter of said ball being such that said ball moves back and lifts when a paper is inserted into said cavity and moves forward and jams into the small end of said tapered cavity to seize said paper if an attempt is made to pull said paper directly from the recess, said detent retainer inside said housing limiting the movements of said coiled spring and ball detent in directions transverse to the direction of normal spring bias.

10. The message holder of claim 9 and at least one piece of sponge-like material on the back of said mounting plate, a pressure sensitive adhesive on at least the exposed surface of said sponge-like material, and a release paper covering said pressure adhesive.

* * * * *